United States Patent
Nguyen

(10) Patent No.: US 7,946,345 B2
(45) Date of Patent: May 24, 2011

(54) METHODS AND COMPOSITIONS FOR CARRIER FLUIDS COMPRISING WATER-ABSORBENT FIBERS

(75) Inventor: Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 12/627,756

(22) Filed: Nov. 30, 2009

(65) Prior Publication Data

US 2010/0075872 A1   Mar. 25, 2010

Related U.S. Application Data

(63) Continuation of application No. 10/915,024, filed on Aug. 10, 2004, now abandoned.

(51) Int. Cl.
*E21B 33/138* (2006.01)
(52) U.S. Cl. .................. 166/300; 166/308.2; 166/308.3
(58) Field of Classification Search .............. 166/30, 166/308.2, 308.3, 305.1, 280.2, 300
See application file for complete search history.

(56) References Cited

U.S. PATENT DOCUMENTS

| | | | | | |
|---|---|---|---|---|---|
| 4,632,876 | A | * | 12/1986 | Laird et al. ............. | 428/404 |
| 4,836,940 | A | * | 6/1989 | Alexander ............... | 507/119 |
| 6,169,058 | B1 | * | 1/2001 | Le et al. .................. | 507/222 |
| 6,209,643 | B1 | * | 4/2001 | Nguyen et al. .......... | 166/276 |
| 6,949,491 | B2 | * | 9/2005 | Cooke, Jr. ................ | 507/219 |

\* cited by examiner

*Primary Examiner* — William P Neuder
(74) *Attorney, Agent, or Firm* — Robert A. Kent; McDermott Will & Emery LLP

(57) ABSTRACT

The present invention relates to methods and compositions for carrier fluids comprising water-absorbent fibers. One embodiment of the present invention provides a method of treating a portion of a subterranean formation, comprising providing a slurry wherein the slurry comprises a servicing fluid, particulates, and a degradable, water-absorbent material wherein the degradable, water-absorbent material acts to help keep the particulates from settling out of the slurry; and, introducing the slurry into the portion of the subterranean formation. Another embodiment of the present invention provides a slurry suitable for use in subterranean operations comprising a servicing fluid, particulates, and a degradable, water-absorbent material wherein the degradable, water-absorbent material acts to help keep the particulates from settling out of the slurry.

20 Claims, No Drawings

METHODS AND COMPOSITIONS FOR CARRIER FLUIDS COMPRISING WATER-ABSORBENT FIBERS

CROSS-REFERENCE TO RELATED APPLICATIONS

This application is a continuation of U.S. application Ser. No. 10/915,024, filed on Aug. 10, 2004 now abandoned and published as U.S. Patent Application Publication No. 2006/0032633 on Feb. 16, 2006, the entirety of which is incorporated herein by reference.

BACKGROUND

The present invention relates to hydraulic fracturing treatments. More particularly, the present invention relates to methods and compositions for carrier fluids comprising water-absorbent fibers.

Servicing fluids comprising suspended or slurried particulates are used in a variety of operations and treatments performed in oil and gas wells. Such operations and treatments include, but are not limited to, well completion operations such as fracturing, gravel packing, and frac-packing.

An example of a production stimulation operation using a servicing fluid having particles suspended therein is hydraulic fracturing. That is, a type of servicing fluid referred to in the art as a fracturing fluid is pumped through a well bore into a subterranean zone to be stimulated at a rate and pressure such that fractures are formed and extended into the subterranean zone. The fracture or fractures may be horizontal or vertical, with the latter usually predominating, and with the tendency toward vertical fractures generally increasing with the depth of the formation being fractured. Generally, fracturing fluids are viscous fluids in the form of gels, emulsions, or foams. The particulate materials used in these operations are often referred to as proppant. The proppant is deposited in the fracture and functions, inter alia, to maintain the integrity of the fracture open while maintaining conductive channels through which such produced fluids can flow upon completion of the fracturing treatment and release of the attendant hydraulic pressure.

Suspended or slurried particulates also are used in well completion operations such as gravel packing. Gravel packing treatments are used, inter alia, to reduce the migration of unconsolidated formation particulates into the well bore. In gravel packing operations, particulates, often referred to in the art as gravel, are carried to a well bore in a subterranean producing zone by a servicing fluid that acts as a gravel carrier fluid. That is, the particulates are suspended in a carrier fluid, which may be and usually is viscosified, and the carrier fluid is pumped into a well bore in which the gravel pack is to be placed. As the particulates are placed in or near the zone, the carrier fluid leaks off into the subterranean zone and/or is returned to the surface. The resultant gravel pack acts as a sort of filter to prevent the production of the formation solids with the produced fluids. Traditional gravel pack operations involve placing a gravel pack screen in the well bore before packing the surrounding annulus between the screen and the well bore with gravel. The gravel pack screen is generally a filter assembly used to support and retain the gravel placed during the gravel pack operation. A wide range of sizes and screen configurations is available to suit the characteristics of a well bore, the production fluid, and any particulates in the subterranean formation. Gravel packs are used, among other reasons, to stabilize the formation while causing minimal impairment to well productivity.

In some situations, hydraulic fracturing and gravel packing operations may be combined into a single treatment. Such treatments are often referred to as "frac pack" operations. In some cases, the treatments are completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

Previously, fibrous, non-degradable materials, such as glass, aramide, nylon, ceramic, and metal, have been added to carrier fluids to help decrease, or eliminate, the flowback of proppant both during and after the fracturing treatment. In addition to decreasing proppant flowback, these fluids also offered the additional benefits of decreasing the required polymer loadings of viscosifier and lowering the amount of fluid loss during the fracturing treatment. Unfortunately, many of these fluids exhibit limited usefulness, due ate least in part to the fact that after the placement of proppant inside the fracture, the fibers remain within the proppant pack, plugging the pore spaces between the proppant particulate, and causing the fracture conductivity to be significantly diminished under closure stresses.

One area where degradable fibers are commonly used is in the field of disposable absorbent products. Water-absorbent degradable fibers have been used in a variety of applications, including disposable diapers, feminine hygiene products, surgical drapes, and wound dressings. These materials retain their integrity and strength during use, but after such use, may be disposed of more efficiently. Such products typically use woven fibers, and, to date, have not been subjected to widespread use in the oilfield industry.

SUMMARY OF THE INVENTION

The present invention relates to hydraulic fracturing treatments. More particularly, the present invention relates to methods and compositions for carrier fluids comprising water-absorbent fibers.

One embodiment of the present invention provides a method of treating a portion of a subterranean formation, comprising providing a slurry wherein the slurry comprises a servicing fluid, particulates, and a degradable, water-absorbent material wherein the degradable, water-absorbent material acts to help keep the particulates from settling out of the slurry; and, introducing the slurry into the portion of the subterranean formation.

Another embodiment of the present invention provides a method of placing proppant into a fracture within a portion of a subterranean formation, comprising providing a slurry wherein the slurry comprises a servicing fluid, particulates, and a degradable, water-absorbent material wherein the degradable, water-absorbent material acts to help keep the particulates from settling out of the slurry; and, introducing the slurry into the fracture within a portion of a subterranean formation.

Another embodiment of the present invention provides a slurry suitable for use in subterranean operations comprising a servicing fluid, particulates, and a degradable, water-absorbent material wherein the degradable, water-absorbent material acts to help keep the particulates from settling out of the slurry.

The features and advantages of the present invention will be readily apparent to those skilled in the art upon a reading of the description of the preferred embodiments that follows.

DESCRIPTION OF PREFERRED EMBODIMENTS

The present invention relates to hydraulic fracturing treatments. More particularly, the present invention relates to methods and compositions for carrier fluids comprising water-absorbent fibers.

In accordance with the present invention, a carrier fluid comprising degradable, water-absorbent material (preferably in the form of fibers) may be used to effectively transport particulates down hole. The use of degradable, water-absorbent material to increase a fluid's ability to transport proppant in place of or in addition to conventional gelling agents (such as guars) may allow the fluid to carry the particulates with less sensitivity to well conditions (e.g., permeability, fluid loss, temperature). After the transport and placement of the particulates in a fracture or a well bore, the water-absorbent fibers are allowed to degrade. In some embodiments, the degradation of the water-absorbent fibers occurs relatively quickly such that the degradation products are returned to the surface when the carrier fluid reverts to a thin fluid. In other embodiments, the degradation of the water-absorbent fibers occurs more slowly and may continue during the production of the well.

The addition of degradable, water-absorbent fibers to a carrier fluid offers numerous benefits. The addition of fibrous material to a carrier fluid has been proven to decrease the need of polymer loadings of viscosifier and to decrease fluid loss during subterranean operations such as fracturing. The degradable, water-absorbent fibers also act to increase the ability of a carrier fluid to suspend particles (such as proppant or gravel) by, inter alia, creating a chemical and/or a crosslinked network or providing a mechanical network. Such networks may also act to lessen the effects temperature may have on the viscosity of a carrier fluid comprising degradable, water-absorbent fibers. This allows for enhanced carrier fluid performance at moderate or high temperatures. Particular embodiments of the present invention also help enhance the clean-up and/or removal of the carrier fluid from a proppant pack that has been deposited in a subterranean fracture.

Moreover, where the chosen degradable, water-absorbent fibers of the present invention is a hydrolysable ester or another material that degrades to produce an acid, the degradation of the fibers may facilitate the breakdown of polymerized guar-based gelled fluids that may be used in accordance with the present invention by lowering the pH of the fluids. In particular embodiments, this lower pH may cause the fluids to de-crosslink, reducing their viscosity.

Generally, any know subterranean servicing fluid (such as those commonly used in fracturing and gravel packing operations) may be used as a carrier fluid in accordance with the teachings of the present invention, including aqueous gels, emulsions, and foams. Suitable aqueous gels are generally comprised of water and one or more gelling agents. Suitable emulsions can be comprised of two immiscible liquids such as an aqueous gelled liquid and a liquefied, normally gaseous, fluid, such as carbon dioxide or nitrogen. In exemplary embodiments of the present invention, the servicing fluids are aqueous gels comprised of water, a gelling agent for gelling the water and increasing its viscosity, and, optionally, a crosslinking agent for crosslinking the gel and further increasing the viscosity of the fluid. The increased viscosity of the gelled, or gelled and cross-linked, servicing fluid, inter alia, reduces fluid loss and allows the servicing fluid to transport significant quantities of suspended particulates. The water used to form the servicing fluid may be salt water, brine, or any other aqueous liquid that does not adversely react with the other components.

A variety of gelling agents may be used, including hydratable polymers that contain one or more functional groups such as hydroxyl, carboxyl, sulfate, sulfonate, amino, or amide groups. Particularly useful are polysaccharides and derivatives thereof that contain one or more of the monosaccharide units galactose, mannose, glucoside, glucose, xylose, arabinose, fructose, glucuronic acid, or pyranosyl sulfate. Examples of natural hydratable polymers containing the foregoing functional groups and units that are particularly useful in accordance with the present invention include guar gum and derivatives thereof, such as hydroxypropyl guar, and cellulose derivatives, such as hydroxyethyl cellulose. Hydratable synthetic polymers and copolymers that contain the above-mentioned functional groups can also be used. Examples of such synthetic polymers include, but are not limited to, polyacrylate, polymethacrylate, polyacrylamide, polyvinyl alcohol, and polyvinylpyrrolidone. The gelling agent used is generally combined with the water in the fracturing fluid in an amount in the range of from about 0.01% to about 2% by weight of the water.

Examples of crosslinking agents that can be used to further increase the viscosity of a gelled servicing fluid are alkali metal borates, borax, boric acid, and compounds that are capable of releasing multivalent metal ions in aqueous solutions. Examples of multivalent metal ions include chromium, zirconium, antimony, titanium, iron, zinc, or aluminum. When used, the crosslinking agent is generally added to the gelled water in an amount in the range of from about 0.01% to about 5% by weight of the water.

The gelled or gelled and cross-linked servicing fluids may also include internal delayed gel breakers such as enzyme, oxidizing, acid buffer, or temperature-activated gel breakers. The gel breakers cause the viscous carrier fluids to revert to thin fluids that can be produced back to the surface after they have been used to place particulates in subterranean operations. The gel breaker used is typically present in the servicing fluid in an amount in the range of from about 1% to about 5% by weight of the gelling agent. The servicing fluids may also include one or more of a variety of well-known additives, such as gel stabilizers, fluid loss control additives, clay stabilizers, bactericides, and the like.

Generally, degradable, water-absorbent materials suitable for use in the present invention readily absorb water when exposed to an aqueous environment and slowly degrade or dissolve depending on the ambient temperature. Examples of degradable, water-absorbent materials suitable for use with the present invention include poly(lactic acid) polymers, which may be prepared by the polymerization of lactic acid and/or lactide. By modifying the stereochemistry of the poly (lactic acid) polymer, the physical properties of the polymer, such as melting temperature, melt rheology, crystallinity, and degree of absorbance, may be modified as well. Other degradable, water-absorbent materials suitable for use in the present invention include, but are not limited to, poly(ortho esters), polybutylene succinate, polybutylene succinate-co-adipate, polyhydroxybutyrate-valerate, polyhydroxybutyrate-covalerate, polycaprolactone, polyester amide, starch-based polymers, and mixtures and copolymers thereof. Other suitable polymers include, but are not limited to, polyethylene terephthalate-based polymers, sulfonated polyethylene terephthalate, polyethylene oxide, polyethylene, polypropylene, polyvinyl alcohol, and aliphatic aromatic copolyester. Additional information on degradable, water-absorbent fibers suitable for use in increasing a fluid's ability to transport particulates may be found in U.S. Pat. No. 5,698,322 issued to Tsai, et al., and U.S. Pat. No. 6,135,987 issued to Tsai, et al., the relevant disclosures of which are herein incorporated by reference.

Typically, the water-absorbent materials are present in an amount of from about 0.01% to about 10% by weight of the carrier fluid. In particular embodiments, the water-absorbent materials may be present in an amount of from about 0.1% to about 2% by weight of the carrier fluid. Any suitable method mixing the water-absorbent materials with the carrier fluid may be used in accordance with the teachings of the present invention. In particular embodiments, these may include batch blending or adding the water-absorbent materials directly to the flow stream as the carrier fluid is being pumped down hole (i.e., on-the-fly).

In some embodiments of the present invention, the degradable, water-absorbent particulate material is used in the form of fibers (i.e., materials having a length-to-diameter ratio greater than about 10). Generally, the degradable, water-absorbent materials may range in length from about 50 microns to about 50,000 microns, provided the selected length of the fibers does not interfere with the mixing and pumping of the carrier fluid. In particular embodiments of the present invention, the water-absorbent materials may be the only material used to increase a fluid's ability to carry particulates. In other embodiments, the water-absorbent materials may be combined and mixed with viscosifiers (such as guar gums, or viscoelastic surfactants) to increase the ability of a fluid to transport particulates.

Particular embodiments of the present invention also further comprise super-absorbent fibers that may be combined with the aforementioned degradable, water-absorbent fibers of the present invention. Preferably, these super-absorbent fibers are water-swellable, delayed-degradable polymers having a high liquid absorption capacity. In exemplary embodiments, these super-absorbent fibers include fibers prepared from a mixture of poly(vinylamine) polymer and polyacrylic acid. Other examples of suitable super-absorbent fibers include, but are not limited to, modified cellulose, modified lignocellulose, and modified polysaccharide. In particular embodiments, these "modified" polymers are modified by sulfating the polymers. Furthermore, in particular embodiments of the present invention, the modified polymers may be crosslinkable.

Generally, super-absorbent fibers are made by applying a super-absorbent polymer to substrate fibers by surrounding fibers in the substrate or by bonding the super-absorbent polymer to itself or to substrate fibers with, for example, crosslinkers in a super-absorbent polymer or pre-polymer solution. Crosslinking may, for example, form bonds which range from highly ionic to highly covalent types of bonds or the like. These bonds can be further augmented with hydrogen bonds and/or induced polar bonds. Suitable methods of applying the super-absorbent polymer to the fiber substrate include saturation, printing, coating, and spraying. Examples of suitable application methods are taught in U.S. Pat. No. 4,500,315 issued Feb. 19, 1985, PCT Publication No. WO 00/50096 published Aug. 31, 2000, European Patent Application No. 0 947 549 A1 published Oct. 6, 1999, U.S. Pat. No. 6,417,425 issued Jul. 9, 2002, and in U.S. Pat. No. 5,962,068 issued Oct. 5, 1999. In one particular method, namely an in-situ polymerization super-absorbent coating process, a super-absorbent monomer solution containing monomer, crosslinkers and initiators is sprayed onto the substrate, the sprayed substrate is exposed to UV radiation and/or other radiation in order to polymerize and crosslink the monomer, and the irradiated substrate is then exposed to heat to remove any remaining moisture. In another method, the nonwoven is coated on one or both sides, with the super-absorbent polymer either completely covering the nonwoven or covering the nonwoven only in discreet areas with the super-absorbent polymer containing activatable cross-linkers which are activated to cross-link the super-absorbent polymer.

Suitable super-absorbent polymers may include, for example, alkali metal salts of polyacrylic acids; polyacrylamides; polyvinyl alcohol; ethylene maleic anhydride copolymers; polyvinyl ethers; hydroxypropylcellulose; polyvinyl morpholinone; polymers and copolymers of vinyl sulfonic acid, polyacrylates, polyacrylamides, polyvinyl pyridine; and the like. Other suitable polymers include hydrolyzed acrylonitrile grafted starch, acrylic acid grafted starch, and isobutylene maleic anhydride copolymers and mixtures thereof. Other suitable super-absorbent polymers may comprise inorganic polymers such as polyphosphazene and the like. Further details on super-absorbent materials may be found in U.S. Pat. No. 4,500,351 issued Feb. 19, 1985 to Peniak et al., using ISOBAM 18 available from the Kuraray America, Inc. of New York, N.Y., and diethylene triamine cross-linker, or the emulsion method of PCT Publication No. WO 00/50096 published Aug. 31, 2000 by Gartner et al., or using a suitable mixture of monomer, cross-linker, and initiators per the teachings in U.S. Pat. No. 6,417,425 to Whitmore et al., or the method of U.S. Pat. No. 5,962,068 issued Oct. 5, 1999 wherein the redox initiated polymerizing superabsorbent is applied to the fibers.

Generally, the carrier fluids of the present invention are suitable for use in hydraulic fracturing, frac-packing, and gravel packing applications. In exemplary embodiments of the present invention where the carrier fluids are used to carry proppant, the proppant particles are generally of a size such that formation fines that may migrate with produced fluids are prevented from being produced from the subterranean zone. Any suitable proppant may be used, including graded sand, bauxite, ceramic materials, glass materials, nut shell, composite polymer beads, and the like. Generally, the proppant particles have a size in the range of from about 4 to about 400 mesh, U.S. Sieve Series. In some embodiments of the present invention, the proppant is graded sand having a particle size in the range of from about 10 to about 70 mesh, U.S. Sieve Series.

In particular embodiments of the present invention, the proppant may be at least partially coated with a curable resin. In particular embodiments, this resin-coated proppant ("RCP") may comprise proppant that has been pre-coated by a commercial supplier. Suitable commercially available RCP materials include, but are not limited to, pre-cured resin-coated sand, curable resin-coated sand, curable resin-coated ceramics, single-coat, dual-coat, or multi-coat resin-coated sand, ceramic, or bauxite. Some examples available from Borden Chemical, Columbus, Ohio, are "XRT™ CERAMAX P," "CERAMAX I," "CERAMAX P," "ACFRAC BLACK," "ACFRAC CR," "ACFRAC SBC," "ACFRAC SC," and "ACFRAC LTC." Some examples available from Santrol, Fresno, Tex., are "HYPERPROP G2," "DYNAPROP G2," "MAGNAPROP G2," "OPTIPROP G2," "SUPER HS," "SUPER DC," "SUPER LC," and "SUPER HT."

Particular embodiments may also include proppant that is coated on-the-fly with a curable resin. The term "on-the-fly" is used herein to mean that a flowing stream is continuously introduced into another flowing stream so that the streams are combined and mixed while continuing to flow as a single stream as part of the on-going treatment. Coating the proppant particles with the curable resin composition and mixing the resin-treated proppant particles with the fracturing fluid may all be performed on-the-fly. Such mixing may also be described as "real-time" mixing. On-the-fly mixing, as opposed to batch or partial batch mixing, may reduce waste and simplify subterranean treatments. This is due, in part, to the fact that if the components are mixed and then circumstances dictate that the subterranean treatment be stopped or postponed, the mixed components may quickly become unusable. By having the ability to rapidly shut down the mixing of streams on-the-fly, unnecessary waste may be avoided, resulting in, inter alia, increased efficiency and cost savings.

Suitable curable resin compositions include those resins that are capable of forming a hardened, consolidated mass. Suitable resins include, but are not limited to, two-component epoxy-based resins, novolak resins, polyepoxide resins, phenol-aldehyde resins, urea-aldehyde resins, urethane resins, phenolic resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be of the two-component variety mentioned above and use an external catalyst or activator. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F. preferably above about 300° F. Selection of a suitable resin coating material may be affected by the temperature of the subterranean formation to which the fluid will be introduced. By way of example, for subterranean formations having a bottom hole static temperature ("BHST") ranging from about 60° F. to about 250° F., two-component epoxy-based resins comprising a hardenable resin component and a hardening agent component containing specific hardening agents may be preferred. For subterranean formations having a BHST ranging from about 300° F. to about 600° F., a furan-based resin may be preferred. For subterranean formations having a BHST ranging from about 200° F. to about 400° F. either a phenolic-based resin or a one-component HT epoxy-based resin may be suitable. For subterranean formations having a BHST of at least about 175° F. a phenol/phenol formaldehyde/furfuryl alcohol resin also may be suitable. It is within the ability of one skilled in the art, with the benefit of this disclosure, to select a suitable resin for use in embodiments of the present invention and to determine whether a catalyst is required to trigger curing.

Proppant used in accordance with the present invention may also be at least partially coated with a tackifying agent, in addition to any resin that may or may not be present. The tackifying agent may act, inter alia, to enhance the grain-to-grain contact between individual proppant particles and is believed to soften any partially cured resin that may be on the proppant particles. This dual action of the tackifying agent may improve the final consolidation strength of a proppant pack made in accordance with the present invention.

Similar to the application of a curable resin, the tackifying agent may be applied either on-the-fly or as a pre-coat. When used in conjunction with RCP, the tackifying agent is typically applied subsequent to the application of the resin. Compositions suitable for use as tackifying agents in accordance with the present invention comprise any compound that, when in liquid form or in a solvent solution, will form a non-hardening coating upon a proppant particle. In particular embodiments, tackifying agents may include polyamides that are liquids or in solution at the temperature of the subterranean formation such that they are, by themselves, non-hardening when introduced into the subterranean formation. One such compound is a condensation reaction product comprised of commercially available polyacids and a polyamine. Such commercial products include compounds such as mixtures of $C_{36}$ dibasic acids containing some trimer and higher oligomers and also small amounts of monomer acids produced from fatty acids, maleic anhydride, and acrylic acid, and the like. Such acid compounds are commercially available from companies such as Witco Corporation, Union Camp, Chemtall, and Emery Industries. The reaction products are available from, for example, Champion Technologies, Inc., and Witco Corporation. Additional compounds which may be used as tackifying agents include liquids and solutions of, for example, polyesters, polycarbonates and polycarbamates, natural resins such as shellac, and the like. Suitable tackifying agents are described in U.S. Pat. No. 5,853,048 issued to Weaver, et al., and U.S. Pat. No. 5,833,000 issued to Weaver, et al., the relevant disclosures of which are herein incorporated by reference.

Tackifying agents suitable for use in the present invention may be either used such that they form non-hardening coating or they may be combined with a multifunctional material capable of reacting with the tackifying compound to form a hardened coating. A "hardened coating" as used herein means that the reaction of the tackifying compound with the multifunctional material will result in a substantially non-flowable reaction product that exhibits a higher compressive strength in a consolidated agglomerate than the tackifying compound alone with the particulates. In this instance, the tackifying agent may function similarly to a hardenable resin. Multifunctional materials suitable for use in the present invention include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and combinations thereof. In some embodiments of the present invention, the multifunctional material may be mixed with the tackifying compound in an amount of from about 0.01 to about 50 percent by weight of the tackifying compound to effect formation of the reaction product. In some preferable embodiments, the compound is present in an amount of from about 0.5 to about 1 percent by weight of the tackifying compound. Suitable multifunctional materials are described in U.S. Pat. No. 5,839,510 issued to Weaver, et al., the relevant disclosure of which is herein incorporated by reference.

Therefore, the present invention is well adapted to attain the ends and advantages mentioned as well as those that are inherent therein. While numerous changes may be made by those skilled in the art, such changes are encompassed within the spirit of this invention as defined by the appended claims.

What is claimed is:

1. A method of treating a portion of a subterranean formation, comprising:
   providing a slurry wherein the slurry comprises a servicing fluid, particulates, a super-absorbent material, and degradable, water-absorbent fibers wherein the degradable, water-absorbent fibers impede the particulates from settling out of the slurry; and,
   introducing the slurry into the portion of the subterranean formation wherein the water-absorbent fibers are present in the slurry as a discontinuous network.

2. The method of claim 1 wherein the degradable, water-absorbent fibers have a length of from about 50 microns to 50,000 microns.

3. The method of claim 1 wherein the degradable, water-absorbent fibers comprise at least one fiber selected from the group consisting of: a poly(lactic acid); a poly(ortho ester); polybutylene succinate; polybutylene succinate-co-adipate; polyhydroxybutyrate-valerate; polyhydroxybutyrate-covalerate; polycaprolactone; a polyester amide; a starch-based polymer; a polyethylene terephthalate-based polymer; sulfonated polyethylene terephthalate; polyethylene oxide; polyethylene; polypropylene; polyvinyl alcohol; an aliphatic aromatic copolyester; and any combination thereof.

4. The method of claim 1 wherein the slurry comprises degradable, water-absorbent fibers present in an amount of from about 0.01% to about 10% by weight of the slurry.

5. The method of claim 1 wherein the slurry comprises degradable, water-absorbent fibers present in an amount of from about 0.1% to about 2% by weight of the slurry.

6. The method of claim 1 wherein the super-absorbent material comprises at least one material selected from the group consisting of: a modified cellulose; a modified lignocellulose; a modified polysaccharide; and a mixture of a poly(vinylamine) polymer and polyacrylic acid.

7. The method of claim 1 wherein the super-absorbent material comprises at least one material selected from the group consisting of: an alkali metal salt of polyacrylic acid; polyacrylamide; polyvinyl alcohol; an ethylene maleic anhydride copolymer; polyvinyl ether; hydroxypropylcellulose; polyvinyl morpholinone; a polymer or copolymer of vinyl sulfonic acid; polyacrylate; polyacrylamide; polyvinyl pyridine; a hydrolyzed acrylonitrile grafted starch; an acrylic acid grafted starch; an isobutylene maleic anhydride copolymer; polyphosphazene; and any combination thereof.

8. The method of claim 1 wherein the particulates are at least partially coated with a curable resin.

9. The method of claim 1 wherein the particulates are at least partially coated with a tackifying agent.

10. The method of claim 1 wherein the super-absorbent material comprises a super-absorbent fiber.

11. The method of claim 1 wherein the degradable, water-absorbent fibers comprise at least a portion of the super-absorbent material.

12. A method of placing proppant into a fracture within a portion of a subterranean formation, comprising:
providing a slurry wherein the slurry comprises a servicing fluid, particulates, a super-absorbent material, and degradable, water-absorbent fibers wherein the degradable, water-absorbent fibers impede the particulates from settling out of the slurry and wherein the water-absorbent fibers are present in the slurry as a discontinuous network; and,
introducing the slurry into the fracture within a portion of a subterranean formation.

13. The method of claim 12 wherein the degradable, water-absorbent fibers have a length of from about 50 microns to 50,000 microns.

14. The method of claim 12 wherein the degradable, water-absorbent fibers comprise at least one fiber selected from the group consisting of: a poly(lactic acid); a poly(ortho ester); polybutylene succinate; polybutylene succinate-co-adipate; polyhydroxybutyrate-valerate; polyhydroxybutyrate-covalerate; polycaprolactone; a polyester amide; a starch-based polymer; a polyethylene terephthalate-based polymer; sulfonated polyethylene terephthalate; polyethylene oxide; polyethylene; polypropylene; polyvinyl alcohol; an aliphatic aromatic copolyester; and any combination thereof.

15. The method of claim 12 wherein the slurry comprises degradable, water-absorbent fibers present in an amount of from about 0.01% to about 10% by weight of the slurry.

16. The method of claim 12 wherein the slurry comprises degradable, water-absorbent fibers present in an amount of from about 0.1% to about 2% by weight of the slurry.

17. The method of claim 12 wherein the super-absorbent material comprises at least one material selected from the group consisting of: a modified cellulose; a modified lignocellulose; a modified polysaccharide; and a mixture of a poly(vinylamine) polymer and polyacrylic acid.

18. The method of claim 12 wherein the super-absorbent material comprises at least one material selected from the group consisting of: an alkali metal salt of polyacrylic acid; polyacrylamide; polyvinyl alcohol; an ethylene maleic anhydride copolymer; polyvinyl ether; hydroxypropylcellulose; polyvinyl morpholinone; a polymer or copolymer of vinyl sulfonic acid; polyacrylate; polyacrylamide; polyvinyl pyridine; a hydrolyzed acrylonitrile grafted starch; an acrylic acid grafted starch; an isobutylene maleic anhydride copolymer; polyphosphazene; and any combination thereof.

19. The method of claim 12 wherein the particulates are at least partially coated with a curable resin.

20. The method of claim 12 wherein the particulates are at least partially coated with a tackifying agent.

* * * * *